No. 745,168. PATENTED NOV. 24, 1903.
A. C. EASTWOOD.
SYSTEM FOR CONTROL OF ELECTRIC MOTORS.
APPLICATION FILED JULY 16, 1903.
NO MODEL. 2 SHEETS—SHEET 1.
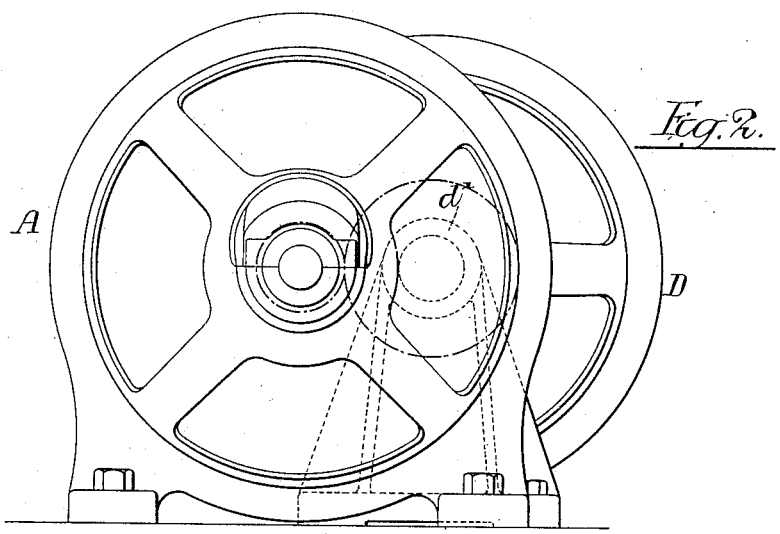
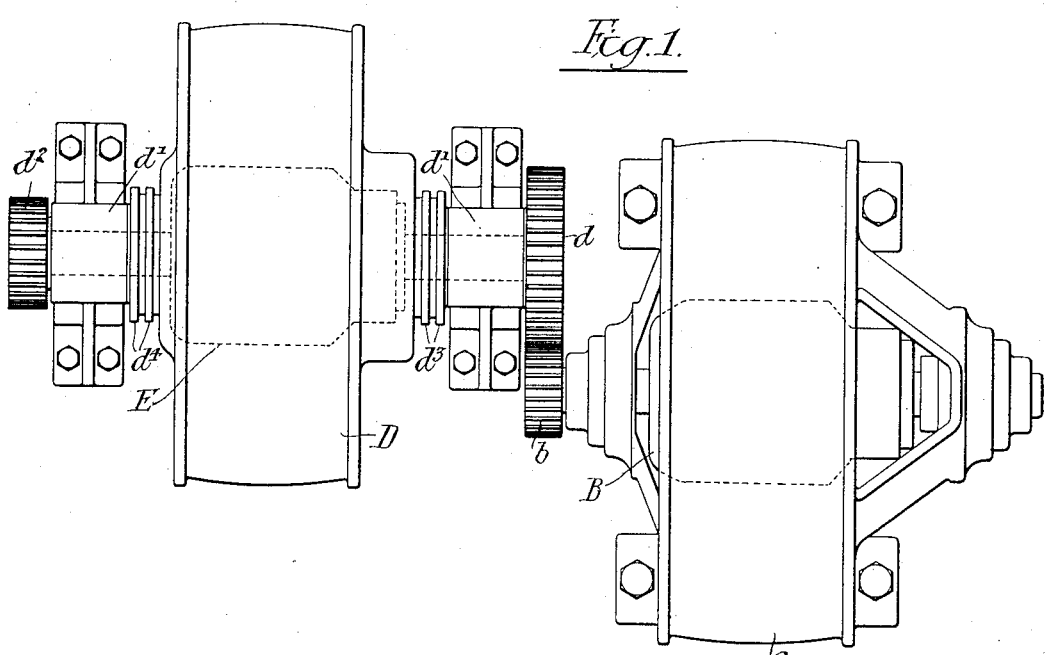

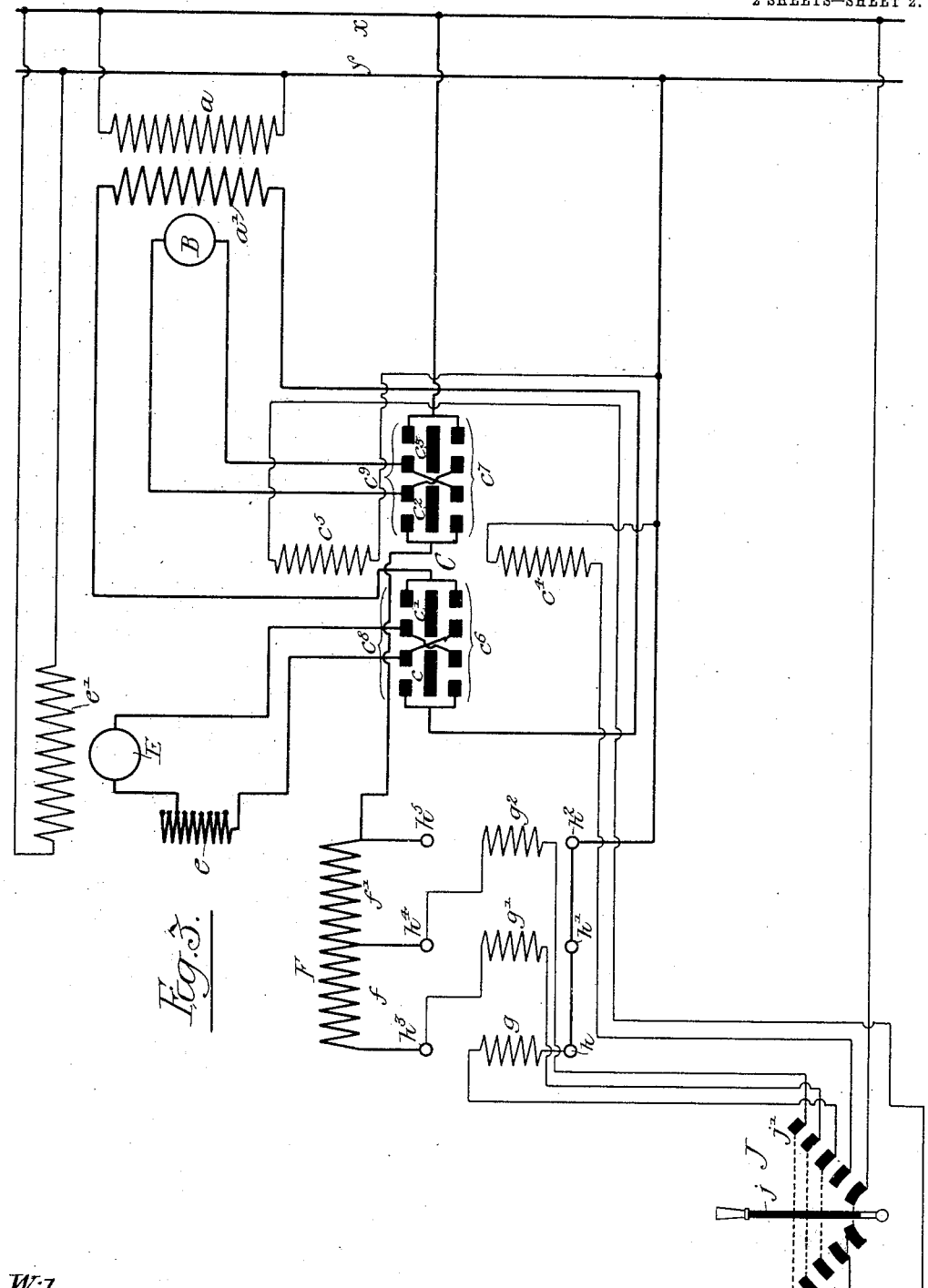

No. 745,168.

Patented November 24, 1903.

UNITED STATES PATENT OFFICE.

ARTHUR C. EASTWOOD, OF CLEVELAND, OHIO.

SYSTEM FOR CONTROL OF ELECTRIC MOTORS.

SPECIFICATION forming part of Letters Patent No. 745,168, dated November 24, 1903.

Application filed July 16, 1903. Serial No. 165,829. (No model.)

*To all whom it may concern:*

Be it known that I, ARTHUR C. EASTWOOD, a citizen of the United States, and a resident of Cleveland, in the State of Ohio, have invented certain Improvements in Systems for Control of Electric Motors, of which the following is a specification.

My invention relates to a new and improved combination of apparatus particularly designed for the transformation of electric into mechanical energy, having for its object the provision of means whereby the torque which may be transmitted by an electric motor will be limited to a certain predetermined extent, so that the receiving apparatus or structure to which the motor is operatively connected cannot be strained by the exertion of an excessive torque thereupon.

My invention also has for its object the provision of means whereby it is possible to arrest the motion of a load operated upon—as, for example, increasing it beyond the predetermined amount—and yet permit the armature of the driving-motor to continue to rotate, so as to continuously transmit to said load the predetermined maximum torque.

The object of the device is thus to protect both the driving-motor and the receiving device, to which it is connected, from the injurious effects of overloads.

There are a number of applications to which electric motors have in the past been found to be poorly adapted, owing to the fact that an ordinary motor cannot permit of its armature being brought to a standstill without injurious results either to the armature itself or to the machine to which it is attached. When the armature of a direct-current motor is brought to rest under load, the current which will flow through it is limited only by the ohmic resistance of the armature and its connections, said current being in general many times the full-load running current of the motor, so that the windings of the armature will be in danger. Further, the excessive torque which will be delivered by the motor under such conditions endangers the gearing or other parts of the machinery to which the armature is connected. An electric motor in this respect is radically different from a steam, hydraulic, or compressed-air motor, the action of which may be arrested by an increase of load without danger either to itself or to the device to which it is connected.

One application of my invention is to the opening and closing of the bucket on machines ordinarily used in unloading ore, coal, and other raw material from the holds of vessels. In the operation of such machines the bucket in closing will frequently bury itself too deeply in the material which it is to handle, so as to arrest the closing thereof, and if the material contains large lumps the jaws of the bucket will frequently have a large piece wedged between them before they reach their fully-closed position, thus bringing to a standstill the closing mechanism.

While it has been feasible to employ electric motors for the operation of the majority of the movable elements of unloading-machines, it has invariably been found necessary, so far as I know, to operate the bucket opening and closing mechanism by means of fluid-actuated pistons acting in suitable cylinders. As will be understood by those skilled in the art, it has therefore been necessary to generate upon the unloading-machine itself the pressure for the operation of the closing mechanism, thus making it necessary to equip each unit with a hydraulic-pressure pump driven by an electric motor, an accumulator, and an elaborate system of piping, in addition to which means must be provided for frequently replenishing the liquid of the hydraulic system, particularly if water be employed. It will therefore be understood that if an electric motor could be employed for operating the bucket mechanism a large amount of complicated machinery could be dispensed with, and the operation of unloading the machine would thereby be made simpler and more reliable. In order to attain this end, I employ the system illustrated in the accompanying drawings, in which—

Figure 1 is a plan view of the electric machine employed to receive current, and thereby operate the bucket opening and closing mechanism. Fig. 2 is an end elevation of the machine shown in Fig. 1. Fig. 3 is a diagrammatic view illustrating the electric connections of my improved sytem of apparatus.

In the above drawings, A represents the frame of a motor having a shunt field-winding $a$ excited directly from the current-supply mains $x$ and $y$ and its armature B connected to the current-supply mains through a reversing-controller, (shown in diagram at C,) whereby the direction of rotation of its armature may be reversed to cause the closing and opening motions of the bucket. This motor is also provided with a separate field-winding $a'$, as set forth hereinafter.

As shown in Fig. 1, the armature B of the driving-motor is connected, by means of gear-wheels $b$ and $d$, to the revolubly-supported field-frame D of a second electric machine, which is carried in bearings $d'$, so as to be free to rotate. The armature E of this second machine is carried by a shaft supported in turn by the bearings $d'$, so as to be also freely rotatable within the field-frame, and to this armature-shaft is connected a gear-wheel $d^2$, to which is attached the receiving device or mechanism to be driven. Contact-rings $d^3$ and $d^4$ are provided for the passage of the armature and field currents of the second electric machine, its field $e'$ being excited directly from the supply-mains $x$ and $y$, as in the case of a shunt-wound motor. It is to be noted, however, that in some cases it may be desirable to have this second or clutch motor series or compound wound, though for the special form of work described above I prefer the shunt-winding, as shown in the diagram.

The armature E of the clutch-motor is connected in series with the separate field-winding $a'$ of the driving-motor through an adjusting resistance $e$. The driving-motor is provided with an extra heavy field, so that as the current increases in the separate field-winding the speed of the armature will be materially reduced.

In order to prevent an injurious rush of current to the armature B of the driving-motor when this latter is started up, I provide any desired form of starting resistance F, this being in the present instance subdivided into two sections $f\,f'$.

In order to most efficiently control the above-described electric machines, I provide in addition to the reversing-switch C three other switches actuated, respectively, by solenoids $g$, $g'$, and $g^2$, the armatures of these being so placed as to electrically connect, by means of suitable blades or movable members, the contacts $h$, $h'$, and $h^2$, which are connected to one of the supply-mains, with the contact-points $h^3$, $h^4$, and $h^5$, respectively connected to different points of the starting resistance F. In the case of the reversing-switch C, I mount four bridging-pieces $c$, $c'$, $c^2$, and $c^3$ upon an arm mechanically connected to a bar carrying the armatures of two solenoids $c^4$ and $c^5$, by which said arm may be actuated to cause the bridging-contacts to engage either one of two sets of contact-fingers $c^6$ and $c^7$ or $c^8$ and $c^9$. The five solenoids I actuate with current directly from the supply-mains through the medium of a controlling-switch J, which switch, as shown in the diagrammatic sketch Fig. 3, may consist of a pivoted arm $j$, mounted so as to form electrical connection between the contacts of one or the other of two sets $j'$ or $j^2$.

Considering the driving-motor to be in operation, its armature will turn the field-frame of the clutch-motor around its armature, and such action will generate current in the armature E, which current will react with the revolving field-frame, so as to cause the armature itself to revolve in the same direction as said field-frame, though it will lag behind it by an amount sufficient to generate the necessary current to keep the load connected to it in motion. The current thus generated passes through the separate field-winding of the driving-motor, and as the load increases, so as to cause the armature to lag behind the field by a greater amount, the current generated will increase in magnitude, still further strengthening the field of the driving-motor. As a result the armature of the driving-motor is caused to slow down, as is also the rotating field-frame of the clutch-motor. The further increase of the load continues to increase the amount of slip between the armature and field of the clutch-motor until finally a point is reached where the field member will just represent the requisite amount of the slip. In such case the speed of the armature of the motor will be zero, and the load will be at rest. It will be thus seen that when a certain critical load is reached the armature of the clutch member will come to rest while, however, the field-frame is still being rotated, though at a comparatively low speed, by the driving-motor. The clutch-motor will thus be acting as a generator, and the current generated will be limited in amount by the resistance of the armature, the connections, and the separate series field-winding of the driving-motor, together with the adjusting resistance $e$. This maximum or critical current may be varied by varying the amount of this adjusting resistance, which, however, will not require changing after once being fixed so as to limit the current to a predetermined amperage. In the meantime the driving-motor will require from the supply-mains just sufficient current to compensate for the loss in the system and to hold the load from slipping, so that although the clutch-motor acting as a generator will be delivering its maximum current when its armature is stalled the amount of energy required from the line will as a whole be quite small, since said current from the clutch-motor is at a very low voltage, just sufficient to force it through the resistance of the armature, connections, separate field-winding, and fixed resistance. In general I have found that this energy when the armature of the clutch-motor is at rest will represent less than twenty per cent. of the full-load current of the driving-motor.

Before starting up the machines to operate a load I close whatever switches may be necessary to excite the two field-windings $a$ and $e'$ and then move the lever $j$ of the controlling-switch J, for example, to the right. The contact-points of this switch are so arranged that said lever will first bridge or electrically connect two pieces necessary to energize the solenoids $c^4$, with the result that the bridging-contacts $c$, $c'$, $c^2$, and $c^3$ are brought into electrical connection with the fingers $c^6$ and $c^7$. The immediate result of this is that a complete circuit is formed between the supply-mains $x$ through the armature B of the driving-motor and through the starting resistance F, so that as the lever $j$ is moved from its central position far enough to engage a third contact the solenoid $g$ is energized, with the result that the contacts $h$ and $h^3$ are bridged, allowing the current to flow in a complete circuit to the supply-mains $y$. Turning now to the clutch-motor, it will be seen that the operation of the solenoid $c^4$ also causes the contacts $c$ and $c'$ to bridge the two pairs of contacts $c^6$, with the result that as soon as current is generated in the armature E by the rotation of the field-frame D said current is permitted to flow through the separate field-winding $a'$ of the driving-motor in a closed circuit and back to the armature E through the adjusting resistance $e$. As the lever $j$ is pushed to its extreme position toward the right it successively bridges the last two contacts $j'$, thereby successively energizing the solenoids $g'$ and $g^2$, with the result that the contact $h'$ is connected to the contact $h^4$, and then the contact $h^2$ engages the contact $h^5$, so that the resistance F is all cut out and the armature B is receiving current direct from the supply-mains. Motion of the lever $j$ in the opposite direction serves to reverse the direction in which the line-current flows through the armature B, and thereby reverses the direction of rotation of said armature and of the field-frame D. This naturally results in the reversal of the direction of rotation of the armature E, and in order that current generated by it shall properly energize the separate field-winding $a'$, in which the direction of flow of current must not be changed, I also reverse the connections between the armature E and the said separate winding $a'$. This reversal of action is secured by the energization of the solenoid $c^5$, which is suitably connected to the second set of contacts $j^2$ of the reversing-switch J.

I claim as my invention—

1. The combination of two electric machines, one of the same having both its armature and its field supported so as to be free to rotate, one of said rotatable parts being mechanically connected to the movable element of the other machine, and the second part to the load to be driven, with electrical connections independent of the motor-supply circuit between the armature of one machine and the field-winding of the other, substantially as described.

2. The combination of a motor having a plurality of field-windings, with a second electric machine constructed so that its armature and field are free to rotate, means for connecting one of the parts of the second machine to the electric motor, and the other to the load to be driven, and electrical connections between the armature of the second machine and one of the field-windings of the electric motor, substantially as described.

3. The combination of two electric machines, one of the same having a plurality of field-windings, means for electrically connecting the field-windings of the second machine and one of the field-windings of the first machine with current-supply mains, and means for electrically connecting the other of the field-windings of the first machine with the armature of the second machine, three of the four elements comprised by the armatures and fields of the two machines being free to rotate, substantially as described.

4. The combination of two electric machines, of which one has both its armature and its field supported so as to be free to rotate, one of said rotatable parts being mechanically connected to the movable element of the other machine, and the second part to the load to be driven, with electrical connections between the two machines, and means for reversing the direction of rotation of that element of the electric machine connected to the load to be driven, substantially as described.

5. The combination of two electric machines, of which one has both armature and field supported so as to be free to rotate, one of said rotatable parts being mechanically connected to the movable element of the other machine, and the second part to the load to be driven, electrical connections between the two machines, means for reversing the direction of rotation of the element of the electric machine connected to the load to be driven, and means for reversing the electrical connections between the machines, substantially as described.

6. The combination of two electric machines, one of the same having both its armature and its field supported so as to be free to rotate, one of said rotatable parts being mechanically connected to the movable element of the other machine, and the second part to the load to be driven, with means operated by current generated by one of the machines for controlling the action of the other, substantially as described.

7. The combination of an electric motor, mechanism to be driven, and an electric machine for connecting said mechanism with the motor, said machine being constructed to generate current and having means whereby such current is caused to act upon the electric motor to vary the speed of rotation of its armature, substantially as described.

8. The combination of an electric motor, with an electric machine connected thereto and to the load to be driven, said machine having field-windings excited from the supply-mains and an armature connected in a closed circuit including means for varying the speed of the armature of the motor, substantially as described.

9. The combination of an electric motor, with an electric machine connected thereto, and to the load to be driven, said machine having field-windings excited from the supply-mains, and an armature connected in a closed circuit including a field-winding placed to act on the armature of the motor, substantially as described.

10. The combination of an electric motor with an electric machine connected thereto and to the load to be driven, said machine having field-windings excited from the supply-mains and an armature connected in a closed circuit including a field-winding placed to act on the armature of the motor, with an adjustable resistance for determining the maximum flow of current from said armature of the electric machine, substantially as described.

11. The combination of two electric machines, of which one has both its field-windings and its armature supported so that they are free to rotate, a plurality of field-windings on the other machine, means for electrically connecting the rotatable field-winding and one of the stationary field-windings with current-supply mains, and means for electrically connecting the other of said windings with the armature of the other machine, said two machines being mechanically connected so that one operates the other, substantially as described.

12. The combination of a compound-wound motor, with an electric machine mechanically connected to the armature thereof, electrical connections between the armature of said machine and one of the field-windings of said motor, means for energizing the field-winding of the machine, and a second field-winding of the motor, with means for simultaneously reversing the direction of flow of current to the armature of the motor and that from the armature of the machine, substantially as described.

13. The combination of two electric machines, one of which has both its field and its armature supported so as to be free to rotate, one of said rotatable elements being mechanically connected to the rotatable element of the other machine, and the second element being connected to the load to be driven, means energized by current generated by the armature of one of the machines for acting on the armature of the other machine to determine its speed, with a device for limiting the amount of said current, substantially as described.

14. The combination of two electric machines, of which one has both field and armature supported so as to be free to rotate, one of said rotatable elements being mechanically connected to the rotatable element of the other machine, and the second element being connected to the load to be driven, means energized by current generated by the armature of one of the machines for acting on the armature of the other machine to determine the speed, with an adjustable resistance for limiting the amount of said current, substantially as described.

15. A system for transforming electrical into mechanical energy, the same including a pair of electrical machines having mechanically-connected parts, electrical connections extending between current-supply mains and one of said machines, other electrical connections from a field-winding of said machine to the armature of the second machine, and means for exciting the field of said second machine, with a switch for reversing the direction of rotation of the armature of one of the machines, and a solenoid having a controlling-switch for actuating said reversing-switch, substantially as described.

16. The combination of two electric machines, of which one has means by which it is mechanically connected to a load to be driven, and means for connecting it to the other machine, resistance for starting one of the machines, means supplied with current from the armature of one of the machines for acting upon the armature of the other machine to vary the speed thereof, a reversing-switch, and switches for cutting out portions of said resistance, with a series of solenoids and a controller for the same for operating said switches, substantially as described.

17. The combination of two electric machines, means for exciting a field-winding on each machine, electrical connections between current-supply mains and the armature of one of the machines and between one of the field-windings of said machine and the armature of the other, with a compound reversing-switch constructed to reverse the direction of flow of the current from said armature to the field-winding and also to reverse the current in the machine to which said field-winding belongs so as to change the direction of rotation of the moving element of said machine, substantially as described.

18. The combination of two electric machines, one of the same having both its armature and its field supported so as to be free to rotate and being driven by the other machine, one of said rotatable parts being connected to the movable element of the driving-machine, and the second part to the load to be driven, resistance divided into sections for controlling the flow of current to the driving-machine, and a series of switches having operating-solenoids connected to throw said sections of resistance into and out of circuit, with a switch for controlling the solenoids, substantially as described.

In testimony whereof I have signed my name to this specification in the presence of two subscribing witnesses.

ARTHUR C. EASTWOOD.

Witnesses:
C. W. COMSTOCK,
J. E. WELLMAN.